May 17, 1927.
L. OLSCHEWSKI
1,628,993
SPRINKLER AND ROTOR ELEMENT THEREFOR
Filed June 28, 1923
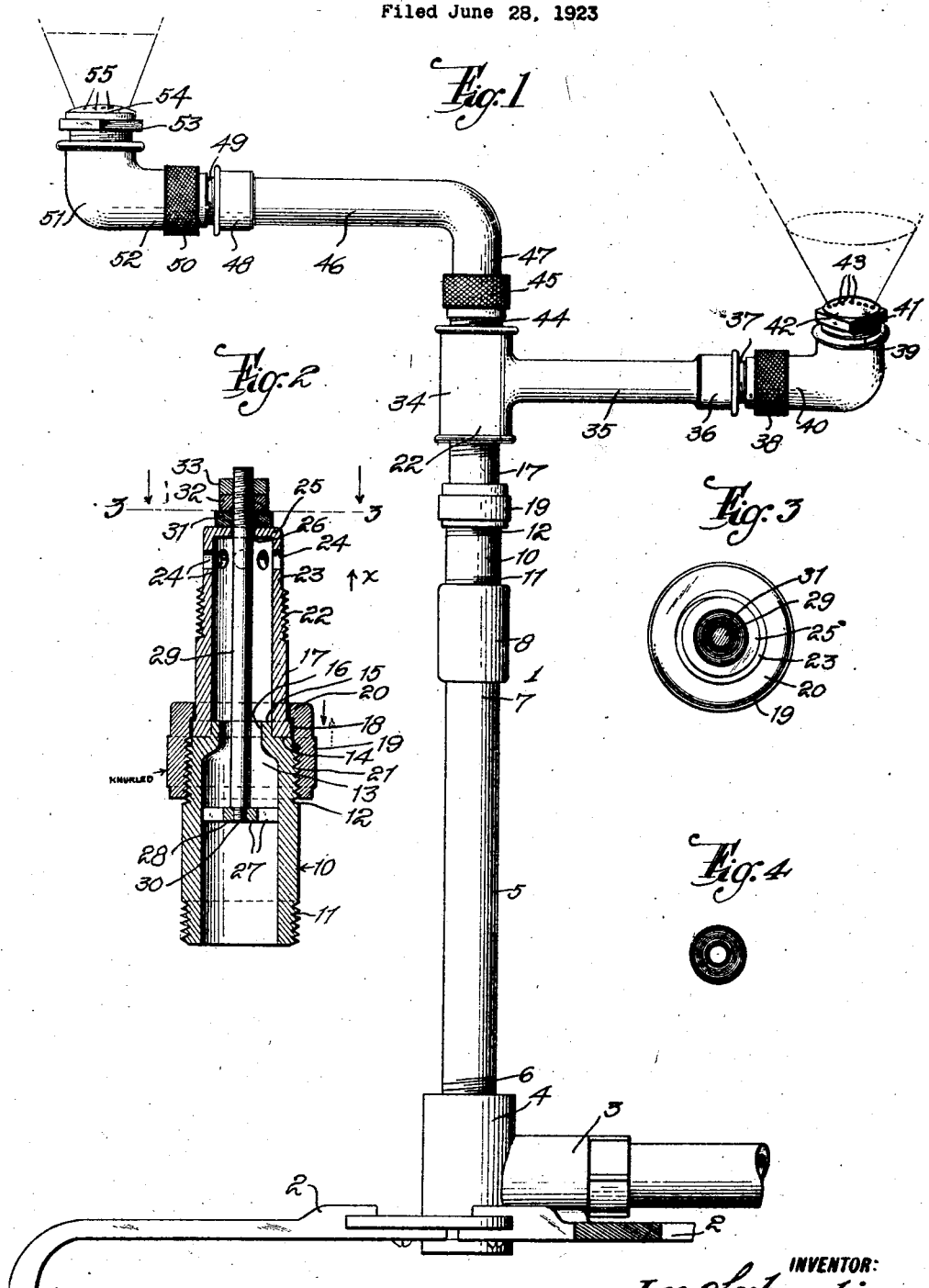
INVENTOR:
Leo Olschewski,
BY
Fraentzel and Richards,
ATTORNEYS.

Patented May 17, 1927.

1,628,993

UNITED STATES PATENT OFFICE.

LEO OLSCHEWSKI, OF IRVINGTON, NEW JERSEY.

SPRINKLER AND ROTOR ELEMENT THEREFOR.

Application filed June 28, 1923. Serial No. 648,386.

This invention relates, generally, to improvements in sprinklers or irrigating devices; and, the present invention has reference, more particularly, to a novel and simple construction of sprinkler, in the form of a stand comprising a main stand-pipe provided with rotatably and movably disposed conveyor-members or elements, each of which is provided at its free end with an adjustable sprinkler-nozzle, said nozzles being adapted to be variously set, so that the speed of rotation may be changed to run fast or slow, and also that the sprinkler may be made to irrigate over a large or a small area, as may be desired; and, furthermore, to provide the stand-pipe with a novel construction of rotor or controlling element, which can be made stationary, to prevent rotation of the sprinkler-arms, if desired.

The present invention has for its principal objects to provide a novel and simply constructed sprinkler comprising a main and vertically disposed stand-pipe, provided with a plurality of movable conveyor-members or elements, each provided with a sprinkler-cap, said members or elements being rotatatably disposed with relation to each other for sprinkling alternately an area to the right or to the left of the stand-pipe, or for sprinkling at one and the same time upon opposite sides of the stand-pipe, the sprinkling faces of the sprinkler-caps being adapted to be variously set at different angles to the vertical axial plane of the stand-pipe; and the conveyor-members or elements being also rotatably disposed with relation to the vertical stand-pipe, for sprinkling in any portion of an area lying in a large or small sector of a circle, all without having to change the position of the sprinkler-stand, and without any danger of becoming wet in making the desired changes.

The present invention has for its further object to provide a novel and simply constructed, as well as an efficiently operating sprinkler provided with sprinkler nozzles or water-heads arranged so that the elevating of one water-head to an angle slightly above the other, causes a spray to form within a circle, giving a complete and even irrigation to the entire area within a seventy-five foot circle; and, furthermore, to provide in connection with the device, a rotor or controlling element which is not liable to be rendered ineffective, due to deterioration caused by the water flowing through the same, and which is easily tightened or locked, so that the revolving member of the rotor or controlling element will not turn, when such an arrangement of the various parts is desired.

Other objects of the present invention not at this time more particularly enumerated will be clearly understood from the following detailed description of the present invention.

The invention is clearly illustrated in the accompanying drawings, in which:—

Figure 1 is a side elevation of a sprinkler-stand showing one embodiment of the principles of the present invention; Figure 2 is a vertical sectional representation of the rotor or controlling element, shown detached from the stand-pipe, and said view being made on an enlarged scale; Figure 3 is a horizontal section of the same, said section being taken on line 3—3 in said Figure 2; and Figure 4 is a view of a washer used with the rotor or controlling element, said washer being of a hard and non-hygroscopic composition, such as a phenolic condensation product.

Similar characters of reference are employed in all of the said above described views, to indicate corresponding parts.

Referring now to the several figures of the drawings, the reference-character 1 indicates, in general, one form of sprinkler embodying the principles of the present invention, the same comprising a suitably formed base, as 2, which is provided with a suitably constructed tubular fitting 3, to which may be attached, in a usual manner, a hose for conducting water to and into said fitting. This fitting is provided with an upwardly extending outlet-member, as 4, to which is attached the lower screw-threaded end-portion 6 of a vertical stand-pipe 5, of any suitable length, the upper end-portion of said stand-pipe being also provided with a screw-thread, as 7. Mounted upon this screw-threaded end-portion 7, as shown more particularly in Figure 6 of the drawings, is a union 8.

The reference-character 9 indicates the novel rotor or controlling element used with the sprinkler-stand, the same comprising a lower tubular member 10 which is externally screw-threaded, as at 11, for attachment to the union 8, as shown in Figure 1 of the drawings. The said member 10 is also externally screw-threaded, as at 12, and has a constructed outlet 13. At a point above the screw-threaded portion 12, the said member 10 is formed with an annular off-set 14, forming a seat, and with an annular projection 15 providing a suitable neck 16. Rotatably seated upon said seat 14 is a tubular rotor-element, as 17, having at its lower end-portion an annular flange 18, with which is in retaining engagement, the portion 20 of a threaded thimble 19, which is internally screw-threaded, as at 21, for positioning said collar upon the screw-threaded portion 12 of the non-rotating member 10, as will be clearly evident from an inspection of said Figure 2 of the drawings. The said rotor-element 17 is also externally screw-threaded, as at 22, and has an upwardly extending portion 23 which is provided with a series of holes 24, forming suitable water-outlets. The said portion 23 is also closed, as at 25, said closed end-portion 25 being provided with a stem-receiving perforation 26.

Within the tubular member 10 is a spider-frame 27, or the like, provided with a screw-threaded hole 28 for the screwing therein of the screw-threaded end-portion 30 of a stem 29, said stem extending upwardly through the perforation 26 and above the end-portion 25, said projecting portion of said stem having mounted thereon a disc or washer 31 of a hard and non-swelling non-hygroscopic material, a phenolic condensation product being the material preferably used, and said disc or washer 31 being suitably secured in place by means of suitable lock-nuts 32 and 33.

It has been found in practice that when the said disc or washer 31 is of metal, or of other material, such as hard rubber, celluloid, or the like, that corrosion of the metal washer, or water-soaking and consequent swelling of the washer made of hard rubber, celluloid, or analagous material, soon causes a non-rotative action of the rotatable member 17 thus defeating the main purpose of the present invention, and for that reason it has been found advisable to make the washer 31 of a hard and non-hygroscopic material, and the best material found for that purpose is a phenolic condensation product. From an inspection of Figure 2 of the drawings, it will clearly be evident, that with the rotor-element 17 set as shown, free and unobstructed rotation of the said element 17 will be had, but that when the threaded thimble 19 is screwed down, a binding action between the parts 18 and 20 will be had, so that the rotor-element 17 will be positively locked against rotation.

As will be understood from an inspection of Figure 1 of the drawings, the water-discharging end-member 23 of the rotor-element 17 extends into a T-fitting 34, which is suitably screwed upon the screw-threaded portion 22, as shown, so as to rotate with the said element 17. Extending laterally from said T-fitting 34 is a tubular member 35, provided at its free end with an internally screw-threaded receiving socket 36, into which is screwed a nipple 37. Suitably screwed upon this nipple 37 is a union, as 38, with which is suitably and rotatably connected the end-portion 40 of an elbow 39, into the free end-portion of which is screwed the screw-threaded portion of a sprinkler-cap 41, said cap being provided in its convexly formed end-wall 42 with a series of openings or perforations 43, preferably extending in a single line diametrically across the surface of the said end-wall. Also connected with the previously mentioned T-fitting 34 is a screw-threaded nipple 44, upon which is screwed a union 45. Connected with this union 45 is the end-portion 47 of another laterally extending tubular member 46, provided at its free end-portion with an internally screw-threaded receiving socket 48. Suitably screwed into this socket 48 is another nipple 49, and screwed upon this nipple is a union 50, with which is suitably and rotatably connected the end-portion 52 of an elbow 51, into the free end-portion of which is screwed the screw-threaded portion of a sprinkler-cap 53, said cap being also provided in its convexly formed end-wall 54 with a series of openings or perforations 55, preferably extending in a single line diametrically across the surface of the said end-wall.

The operation of the sprinkler-device will be clearly understood from the foregoing description of the invention. It will be evident that by variously setting the sprinkler-heads or nozzles at different angles, the sprinkler-arms can be made to revolve at any speed, so as to cause the device to irrigate over a large or a small area. The arrangement of the perforations in the sprinkler-head is such, that the streams of water from each sprinkler-head break into a mist-like cloud, which settles upon the lawn or plants like a heavy dew, thus assuring perfect watering, preventing breakage of delicate plants, and causing the water to penetrate the earth, rather than forming in puddles.

Of course, it will be understood that the number of such outlet members or elements may be decreased or increased, without departing from the scope of the present invention.

I claim:—

1. A rotor-element for sprinklers, comprising a lower tubular member, a tubular rotor-member, said rotor-member having an end-wall provided with a perforation, and said rotor-member being further provided with discharge-orifices, means connected with said lower tubular member for rotatably mounting said rotor-member upon said lower tubular member, a stem within said lower member and said rotor-member, said stem having a portion extending through the perforation in the end-wall of said rotor-member, a disc of phenolic condensation product mounted upon that portion of the stem extending from the end-wall of the rotor-member and against which said end-wall is adapted to rotate, and means upon said stem for maintaining said disc in its position upon the projecting end-portion of said stem.

2. A rotor-element for sprinklers, comprising a tubular member provided with an annular off-set forming a seat, said tubular member being also provided with an externally screw-threaded portion, a tubular rotor-member rotatably seated upon said seat, said rotor-member being provided at its lower end with an annular flange, and at its other end having an end-wall provided with a perforation, and said rotor-member being further provided with discharge-orifices, a threaded thimble screwed upon the said screw-threaded portion of said lower tubular member, said collar having a retaining portion in engagement with the annular flange of the rotor-member for rotatably mounting said rotor-member upon the seat of the said lower tubular member, a stem within said lower member and said rotor-member, said stem having a portion extending through the perforation in the end-wall of said rotor member, a disc of a hard non-hygroscopic material mounted upon that portion of the stem extending from the end-wall of the rotor-member and against which said end-wall is adapted to rotate, and means upon said stem for maintaining said disc in its position upon the projecting end-portion of the said stem.

3. A rotor-element for sprinklers, comprising a lower tubular member provided with an annular off-set forming a seat, said tubular member being also provided with an externally screw-threaded portion, a tubular rotor-member rotatably seated upon said seat, said rotor-member being provided at its lower end with an annular flange, and at its other end having an end-wall provided with a perforation, and said rotor-member being further provided with discharge-orifices, a threaded thimble screwed upon the said screw-threaded portion of said lower tubular member, said collar having a retaining portion in engagement with the annular flange of the rotor-member for rotatably mounting said rotor-member upon the seat of the said lower tubular member, a stem within said lower member and said rotor-member, said stem having a portion extending through the perforation in the end-wall of said rotor-member, a disc of phenolic condensation product mounted upon that portion of the stem extending from the end-wall of the rotor-member and against which said end-wall is adapted to rotate, and means upon said stem for maintaining said disc in its position upon the projecting end-portion of said stem.

In testimony, that I claim the invention set forth above I have hereunto set my hand this 27th day of June, 1923.

LEO OLSCHEWSKI.